United States Patent
West et al.

(10) Patent No.: US 9,657,840 B2
(45) Date of Patent: May 23, 2017

(54) MULTI-LAYER GASKET ASSEMBLY

(71) Applicant: Federal-Mogul Corporation, Southfield, MI (US)

(72) Inventors: Gregory C. West, Pleasant Prairie, WI (US); Steven Kueltzo, Aurora, IL (US); Richard Larson, Des Plaines, IL (US)

(73) Assignee: Federal-Mogul LLC, Southfield, MI (US)

( * ) Notice: Subject to any disclaimer, the term of this patent is extended or adjusted under 35 U.S.C. 154(b) by 31 days.

(21) Appl. No.: 14/462,836

(22) Filed: Aug. 19, 2014

(65) Prior Publication Data
US 2016/0053892 A1 Feb. 25, 2016

(51) Int. Cl.
*F16J 15/12* (2006.01)
*F16J 15/08* (2006.01)

(52) U.S. Cl.
CPC ......... *F16J 15/0825* (2013.01); *F16J 15/122* (2013.01); *F16J 15/128* (2013.01); *F16J 15/123* (2013.01); *F16J 2015/085* (2013.01); *F16J 2015/0837* (2013.01); *F16J 2015/0862* (2013.01); *F16J 2015/0868* (2013.01)

(58) Field of Classification Search
CPC ...... F16J 15/0825; F16J 15/122; F16J 15/123; F16J 15/128; F16J 2015/0837; F16J 2015/0843; F16J 2015/085; F16J 2015/0862
See application file for complete search history.

(56) References Cited

U.S. PATENT DOCUMENTS

| | | | |
|---|---|---|---|
| 1,798,246 A | 3/1931 | Braner | |
| 1,815,601 A | 7/1931 | Victor | |
| 1,815,602 A | 7/1931 | Russell | |
| 1,838,496 A | 12/1931 | Oven | |
| 1,846,402 A | 2/1932 | Oven | |
| 1,864,854 A | 6/1932 | Oven | |
| 1,893,881 A | 1/1933 | Braner | |
| 1,903,990 A | 4/1933 | Fitzgerald | |
| 1,928,116 A | 9/1933 | Stephens | |
| 1,974,633 A * | 9/1934 | Victor | F16J 15/122 277/600 |
| 1,982,759 A | 12/1934 | Rosen | |
| 2,034,610 A | 3/1936 | Dickson | |

(Continued)

FOREIGN PATENT DOCUMENTS

DE 3809017 A1 9/1989

*Primary Examiner* — Nicholas L Foster
(74) *Attorney, Agent, or Firm* — Robert L. Stearns; Dickinson Wright, PLLC

(57) ABSTRACT

An improved gasket assembly including a core layer and at least two facing layers disposed on opposite sides of the core layer is provided. The gasket assembly further includes first and second outer layers which are made of metal and are disposed on opposite sides of the facing layers from the core layer. The core, facing and outer layers all present at least one set of axially aligned openings. The first layer is bent towards the second layer by no greater than ninety degrees at the openings to present a first outer layer flange, and the second layer is bent by no greater than ninety degrees at the openings to present a second outer layer flange. The first and second outer layer flanges are in direct contact with one another to provide a gas tight seal around the set of axially aligned openings.

14 Claims, 4 Drawing Sheets

(56) References Cited

U.S. PATENT DOCUMENTS

| | | | |
|---|---|---|---|
| 3,817,540 A | | 6/1974 | Nicholson |
| 4,465,287 A | * | 8/1984 | Bindel .................. F16J 15/123 |
| | | | 277/601 |
| 4,756,561 A | | 7/1988 | Kawata et al. |
| 4,781,389 A | * | 11/1988 | Beyer .................... F16J 15/123 |
| | | | 277/601 |
| 5,022,431 A | | 6/1991 | Grey et al. |
| 5,092,613 A | | 3/1992 | Udagawa |
| 5,158,305 A | | 10/1992 | Halling |
| 5,280,929 A | * | 1/1994 | Miyaoh ................ F16J 15/0831 |
| | | | 277/595 |
| 5,468,003 A | * | 11/1995 | Staab ..................... F02F 11/002 |
| | | | 277/592 |
| 5,544,900 A | | 8/1996 | Aoki |
| 5,772,215 A | | 6/1998 | West |
| 5,970,612 A | | 10/1999 | West |
| 6,058,918 A | * | 5/2000 | Noetzlin ................ F02B 51/02 |
| | | | 123/670 |
| 6,131,915 A | * | 10/2000 | Nicholson ............ F16J 15/0825 |
| | | | 277/593 |
| 6,733,885 B2 | | 5/2004 | Kincart |
| 8,376,370 B2 | * | 2/2013 | Ueda .................... F16J 15/0818 |
| | | | 277/592 |
| 8,382,122 B2 | * | 2/2013 | Ueda ...................... F16J 15/122 |
| | | | 277/592 |
| 2006/0006609 A1 | | 1/2006 | Sandford et al. |
| 2011/0204580 A1 | * | 8/2011 | Tripathy .............. F16J 15/0825 |
| | | | 277/593 |
| 2012/0227698 A1 | * | 9/2012 | Tripathy ................ F02F 11/002 |
| | | | 123/193.1 |

* cited by examiner

MULTI-LAYER GASKET ASSEMBLY

BACKGROUND OF THE INVENTION

1. Field of the Invention

The present invention is related generally to gasket assemblies for establishing a gas-tight seal around an opening.

2. Related Art

Gasket assemblies are often used to seal and prevent leakage between two parts, such as a cylinder head and an exhaust manifold of an internal combustion engine. Sealing the gap, however, can be difficult because the cylinder head and the exhaust manifold may move relative to one another due to pressure and temperature fluctuations during operation of the engine. This may result in the gasket assembly being subjected to pressure changes during operation of the engine. Additionally, the cylinder head, exhaust manifold and gasket assembly may each experience thermal expansion and contraction in response to temperature variations in the cylinder head.

Multi-layered metal gasket assemblies including a steel core layer, one or more facing layers and top and bottom layers have been employed to protect against the problems that may result from the pressure and temperature changes that the gasket assembly may experience during use. Such designs typically employ eyelets or grommets made of various materials at the openings. However, such eyelets or grommets add to the cost and complexity of the gasket assembly.

SUMMARY OF THE INVENTION

One aspect of the present invention provides for an improved gasket assembly including a core layer and at least two facing layers disposed on opposite sides of the core layer. The gasket assembly further includes first and second outer layers which are made of metal and are disposed on opposite sides of the facing layers from the core layer. The core layer; the facing layers; and the first and second outer layers all present at least one set of axially aligned openings. The first layer is bent towards the second layer by no greater than ninety degrees at the set of aligned openings to present a first outer layer flange, and the second layer is bent by no greater than ninety degrees at the set of aligned openings to present a second outer layer flange. The first and second outer layer flanges are in direct contact with one another to provide a gas tight seal around the set of axially aligned openings for protecting the facing layers from gasses flowing through the openings.

The gasket assembly is advantageous because the facing layers are protected from the exhaust gasses without the need for any grommets or eyelets that are found on other known gasket assemblies. Further, since the first and second outer layer flanges are bent by no more than ninety degrees, they may be formed into the first and second outer layers through blanking operations simultaneous to the cutting of the openings into those layers.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
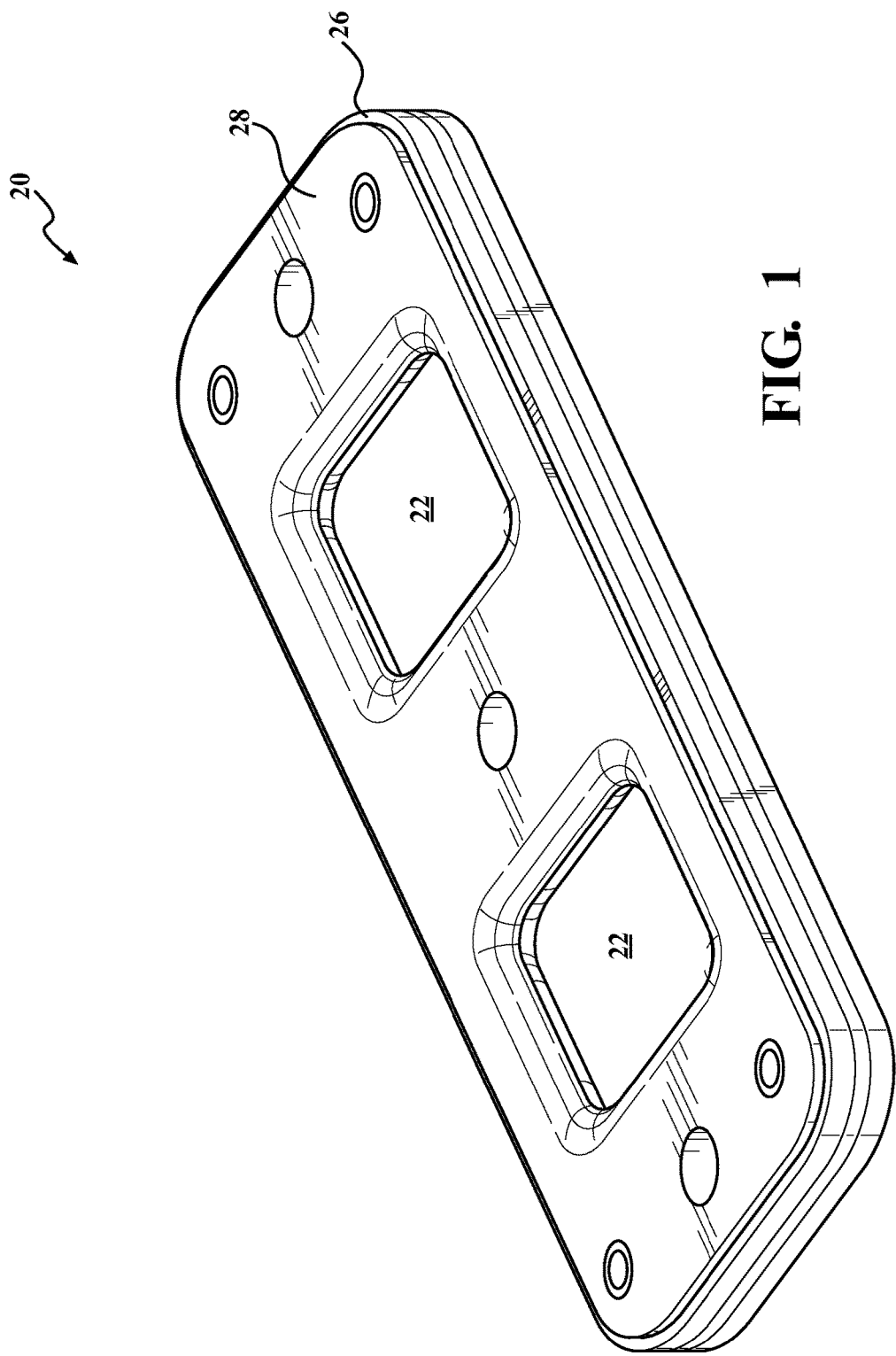
FIG. 1 is a perspective view of a first exemplary embodiment of a gasket assembly.
Figure 2:
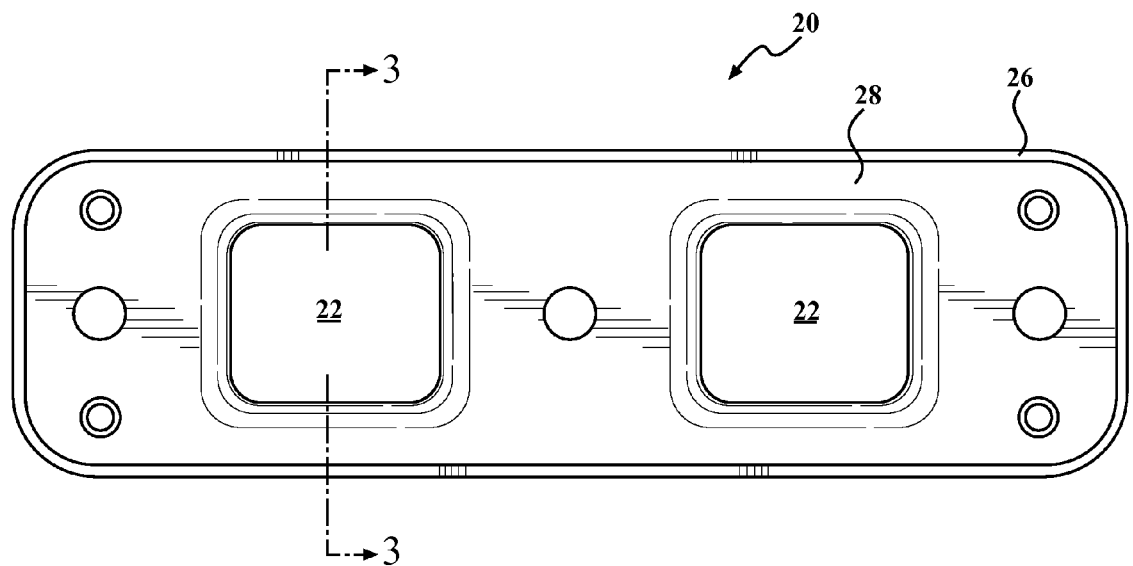
FIG. 2 is a top elevation view of the gasket assembly of FIG. 1.
Figure 3:
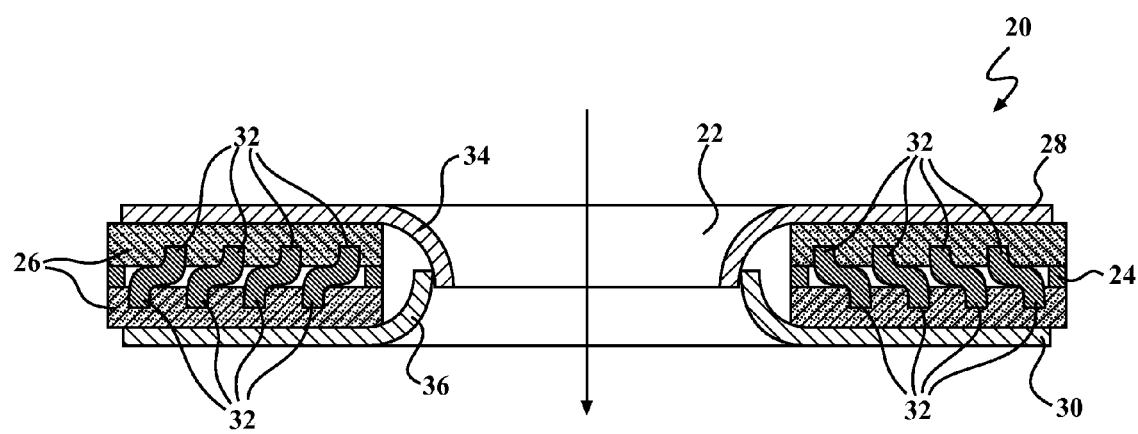
FIG. 3 is a cross-sectional view of the gasket assembly of FIG. 2 taken along Line 3-3 of FIG. 2.

Referring to the Figures, wherein like numerals indicate corresponding parts throughout the several views, a first exemplary embodiment of a gasket assembly 20 is shown in FIGS. 1-3. The gasket assembly 20 of the first exemplary embodiment is an exhaust manifold gasket in that it's configured for establishing a gas tight seal between a cylinder head (not shown) and an exhaust manifold (not shown) of an internal combustion engine. However, it should be appreciated that the gasket assembly 20 could alternately be configured for a range of different sealing applications.

As shown in FIGS. 1 and 2, the exemplary gasket assembly 20 includes a plurality of discrete openings that are spaced from one another. Two of the openings 22 are generally rectangular in shape and are exhaust gas openings 22 for conveying exhaust gasses from the cylinder head to the exhaust manifold. The spacing, size, and shapes of the exhaust gas openings 22 may vary depending on the cylinder head and exhaust manifold for which the gasket assembly 20 is configured. The other openings may be located, sized, and shaped for receiving mounting bolts or for any other suitable purpose.

Referring now to FIG. 3, the exemplary gasket assembly 20 is a multi-layer gasket assembly 20 including a core layer 24, a pair of facing layers 26, a first outer layer (hereinafter referred to as a "top layer 28") and a second outer layer (hereinafter referred to as a "bottom layer 30"). The core layer 24 is preferably made of plate steel (or any suitable material including, for example, stainless steel) and has a first surface (hereinafter referred to as an "upper surface") and a second surface (hereinafter referred to as a "lower surface"). As shown, the core layer 24 is perforated to present a plurality of tangs 32 on the upper surface and a plurality of tangs 32 on the lower surface. One of the facing layers 26 is disposed on the upper surface of the core layer 24 with the tangs 32 on the upper surface biting or mechanically clenching into that facing layer 26. Likewise, the other facing layer 26 is disposed on the lower surface of the core layer 24 with the tangs 32 on the lower surface biting or mechanically clenching into that facing layer 26. The tangs 32 impart additional strength to the facing layers 26 and minimize separation of the facing layers 26 from the core layer 24 or slippage of the facing layers 26 under high load conditions. The facing layers 26 are preferably made of a non-metallic material, such as graphite. As shown, the openings 22 of the facing layers 26 and the core layer 24 are axially aligned with one another to provide a through passage for the flow of exhaust gasses.

Referring still to FIG. 3, the top and bottom layers 28, 30 are positioned on opposite sides of the facing layers 26 such that the facing layers 26 and the core layer 24 are sandwiched between the top and bottom layers 28, 30. At each of the exhaust openings 22, the top and bottom layers 28, 30 extend inwardly past the inner peripheries of the facing and core layers 26, 24. The inner areas of the top and bottom layers 28, 30 are bent or curved axially towards one another and in direct contact with one another to establish a gas tight seal around the exhaust opening 22 for protecting the facing layers 26 from the exhaust gasses flowing through the exhaust opening 22 during operation of the engine. More specifically, the top layer 28 is bent downwardly towards the bottom layer 30 to present a top layer flange 34, and the bottom layer 30 is bent upwardly towards the top layer 28 to present a bottom layer flange 36. The top and bottom layer flanges 34, 36 are in direct contact with one another to establish the gas tight seal around the exhaust opening 22.

As shown in FIG. 3, the top and bottom layers 28, 30 are each bent inwardly at the exhaust gas opening 22 by no greater than ninety degrees (90°). Specifically, in the exemplary embodiment, the top and bottom layers 28, 30 are bent by approximately 90° such that the ends of the top and bottom layer flanges 34, 36 extend transversely to the flat surrounding portions of the top and bottom layers 28, 30. This is advantageous because it allows the gasket assembly 20 to be manufactured at a lower cost as compared to other known gasket assemblies 20 while still protecting the facing layers 26 from the exhaust gasses.

In the first exemplary embodiment, the top and bottom layer flanges 34, 36 overlap one another in the axial direction. More precisely, the top layer 28 is curved to extend downwardly past an end of the bottom layer 30. As such, the contact between the top and bottom layer flanges 34, 36 is in a direction that is perpendicular to the axial direction. This contact provides the gas-tight seal for protecting the facing layers 26 from the exhaust gasses. The seal may be strengthened when the gasket assembly 20 is sandwiched between the exhaust manifold is bolted onto the cylinder head, thereby biasing the top and bottom layer flanges 34, 36 of the gasket assembly 20 against one another.

Figure 6:
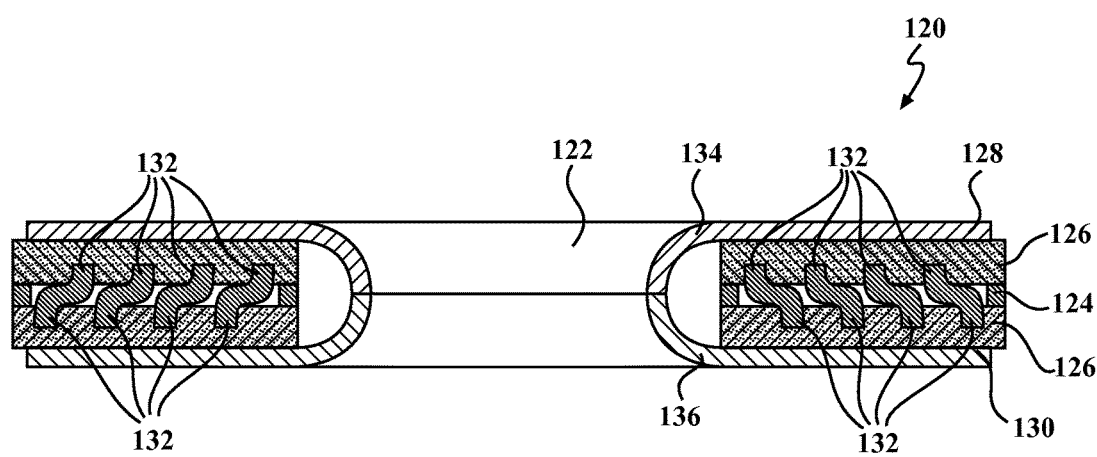
FIG. 6 is a cross-sectional view of an alternate embodiment of the gasket assembly.

Referring now to FIG. 6, an alternate embodiment of the gasket assembly 120 is generally shown wherein like numerals, separated by a factor of 100, indicate corresponding parts with the first exemplary embodiment described above. The alternate embodiment is distinguished from the above-described embodiment in that the top and bottom layer flanges 134, 136 do not overlap with one another. Rather, the ends of the top and bottom layer flanges 134, 136 are in direct contact with one another in a butt joint to provide the gas tight seal for protecting the facing layers 126 from the exhaust gasses.

Referring back to FIGS. 1-3, another aspect of the present invention provides for a method of making a gasket assembly 20. The method includes the step of preparing a core layer 24 which has at least one core layer opening. The method proceeds with the step of engaging a pair of facing layers 26 with the core layer 24 on opposite sides thereof. Each of the facing layers 26 has at least one facing layer opening, and the facing layer openings are aligned axially with the at least one core layer opening of the core layer 24.

Figure 4:
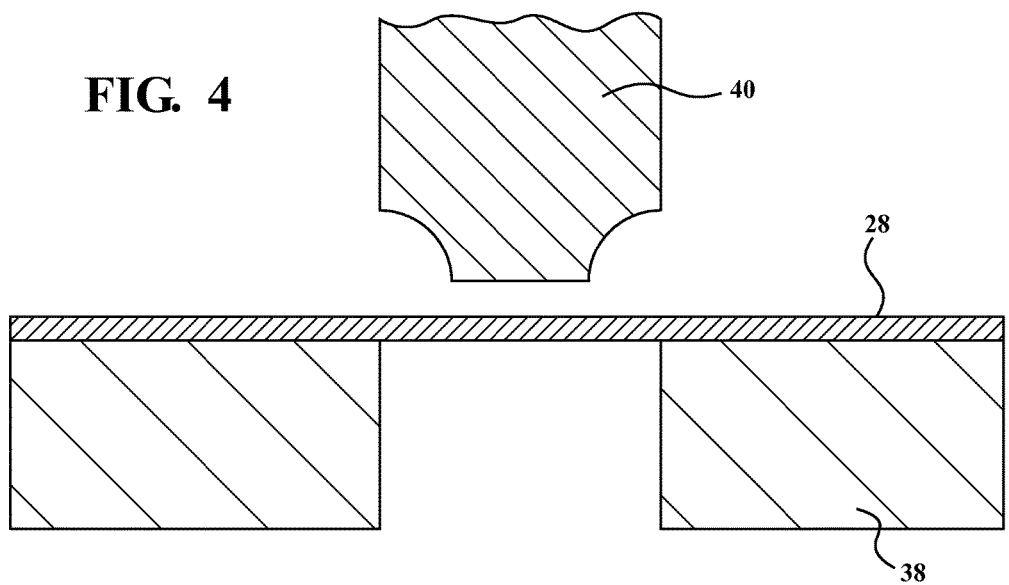
FIG. 4 is a sectional view of a piece of sheet metal loaded into a blanking press for shaping of the sheet steel.
Figure 5:
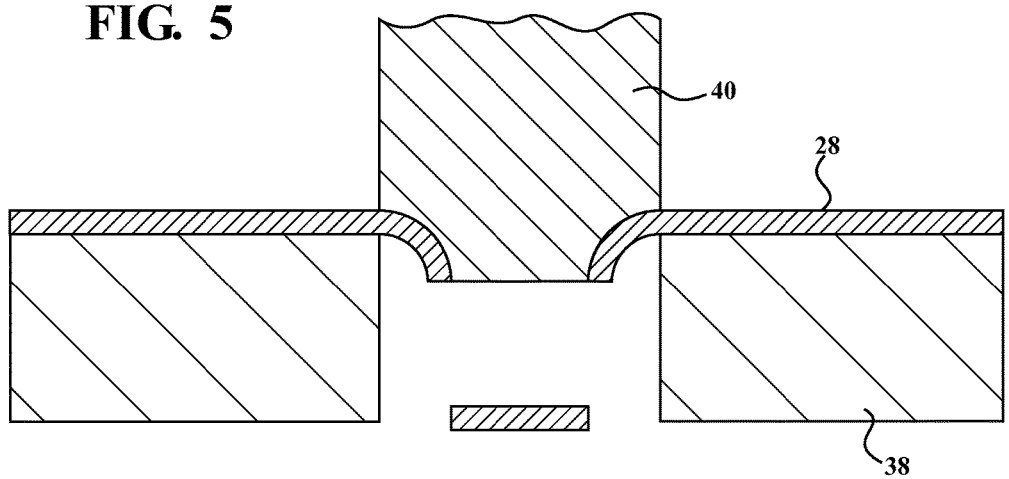
FIG. 5 is a sectional view showing the sheet metal being shaped by the blanking press into the shape of a top outer layer for the exemplary gasket assembly.

The method continues with the steps of bending a top layer 28 of metal at at least one top layer opening by no greater than ninety degrees to present a top layer flange 34 and bending a bottom layer 30 of metal at at least one bottom layer opening by no greater than ninety degrees to present a bottom layer flange 36. FIGS. 4 and 5 show the top layer 28 starting as a piece of sheet metal and being bent to provide the top layer flange 34 through a blanking process. Specifically, a piece of sheet metal 28 is placed on a die 38, and a punch 40 is actuated to piece through the sheet metal 28 to create a top layer opening. The punch 40 has a bottom surface with a curved groove 42 along an outer periphery of the bottom surface for creating the top layer flange 34 in the top layer 28. The top layer 28 is then removed from the die 38. A similar process may be employed to shape the bottom layer 30. The blanking process is particularly advantages because the openings can be formed in the top and bottom layers 28, 30 at a very low cost simultaneous to the bending to create the top and bottom layer flanges 34, 36 respectively.

The method proceeds with the step of positioning the top and bottom layers 28, 30 on opposite sides of the facing layers 26 and with the top and bottom layer flanges 34, 36 extending towards and engaging one another through the core and facing layer openings to provide a gas tight seal which surrounds an exhaust gas opening 22 for protecting the facing layers 26 from exhaust gasses flowing through the exhaust gas opening 22.

Obviously, many modifications and variations of the present invention are possible in light of the above teachings and may be practiced otherwise than as specifically described while within the scope of the appended claims.

What is claimed is:

1. A gasket assembly, comprising:
a core layer;
a first facing layer disposed on one side of said core layer, and a second facing layer disposed on an opposite side of said core layer; and
a first outer layer of metal disposed on an outer facing surface of said first facing layer facing away from said core layer, and a second outer layer of metal disposed on an outer facing surface of said second facing layer facing away from said core layer;
said core layer, said facing layers, and said first and second outer layers presenting a set of axially aligned openings aligned about a central axis extending in an axial direction;
said first outer layer comprising a substantially flat portion substantially parallel to said outer facing surface of said first facing layer transitioning directly to a completely curved portion being curved into said set of axially aligned openings in a convex manner when viewed form said central axis, being curved towards said second outer layer, and being curved by no greater than ninety degrees, said completely curved portion of said first outer layer completely defining a first outer layer flange, said first outer layer flange extending axially along said set of axially aligned openings from said substantially flat portion of said first outer lam to a distal end of said first outer layer which is located inside of said set of axially aligned openings and approximately at a middle of an overall axial thickness of said gasket near said core layer, and
said second outer layer comprising a substantially flat portion substantially parallel to said outer facing surface of said second facing layer transitioning directly to a completely curved portion being curved into said set of axially aligned openings in a convex manner when viewed form said central axis, being curved towards said first outer layer, and being curved by no greater than ninety degrees, said completely curved portion of said second outer layer completely defining a second outer layer flange, said second outer layer flange extending axially along said set of axially aligned openings from said substantially flat portion of said second outer layer to a distal end of said second outer layer which is located inside of said set of axially aligned openings and approximately at said middle of said overall axial thickness of said gasket near said core layer; and wherein said first and second outer layer flanges are in direct contact with one another only in a limited region at or near their respective distal ends with said limited region being substantially smaller than said overall axial thickness of said gasket and located more axially proximate said middle of said overall axial thickness of said gasket than axially proximate to either of said substantially flat portions of said first and second outer layers, wherein said direct contact at said limited region provides a gas tight seal around said set of axially aligned openings for protecting said facing layers from gasses flowing through said set of axially aligned openings.

2. The gasket assembly as set forth in claim 1 wherein said first and second outer layer flanges overlap one another in said axial direction.

3. The gasket assembly as set forth in claim 1 wherein said distal ends of said first and second outer layers are in contact with one another.

4. The gasket assembly as set forth in claim 1 wherein each of said first and second outer layers is curved by approximately ninety degrees at said set of aligned openings.

5. The gasket assembly as set forth in claim 1 wherein there are a plurality of sets of axially aligned openings.

6. The gasket assembly as set forth in claim 1 wherein said core layer includes an upper surface and a lower surface, and said core layer is perforated to present a plurality of tangs on said upper and lower surfaces.

7. The gasket assembly as set forth in claim 6 wherein said first and second facing layers are engaged with said tangs on said core layer.

8. The gasket assembly as set forth in claim 1 wherein said first and second outer layers are made of stainless steel.

9. The gasket assembly as set forth in claim 1 wherein said core layer is made of steel.

10. A method of making the gasket assembly according to claim 1, the method comprising:
   making said gasket assembly of claim 1 and including the steps of:
   preparing said core layer;
   engaging said first facing layer and said second facing layer with the core layer;
   bending said first outer layer of metal to present said first outer layer flange;
   bending said second outer layer of metal to present said second outer layer flange; and
   positioning said first outer layer on said outer facing surface of said first facing layer facing away from said core layer, and positioning said second outer layer on said outer facing surface of said second facing layer facing away from said core layer facing layer.

11. The method of making the gasket assembly of claim 1, as set forth in claim 10, wherein the bending steps of said first and second outer layers are blanking operations.

12. The method of making the gasket assembly of claim 1, as set forth in claim 10, wherein said core layer includes a plurality of tangs on said one side of said core layer and on said opposite side of said core layer thereof, and wherein the first and second facing layers are engaged by the tangs during the engaging step.

13. The method of making the gasket assembly of claim 1, as set forth in claim 10, wherein the step of bending the first outer layer is further defined as bending said first outer layer of metal by approximately ninety degrees.

14. The method of making the gasket assembly of claim 1, as set forth in claim 10, wherein the step of bending the second outer layer is further defined as bending said second outer layer of metal by approximately ninety degrees.

* * * * *